(12) United States Patent
Mitchell

(10) Patent No.: US 8,448,307 B2
(45) Date of Patent: May 28, 2013

(54) HOOK WITH MAGNETIC CLOSURE

(76) Inventor: Lucy A. Mitchell, Melksham (GB)

( * ) Notice: Subject to any disclaimer, the term of this patent is extended or adjusted under 35 U.S.C. 154(b) by 0 days.

(21) Appl. No.: 12/881,744

(22) Filed: Sep. 14, 2010

(65) Prior Publication Data
US 2012/0060332 A1 Mar. 15, 2012

(51) Int. Cl.
*F16B 45/02* (2006.01)

(52) U.S. Cl.
USPC .......................... 24/601.5; 24/265 H; 24/303

(58) Field of Classification Search
USPC ................. 24/601.5, 599.2, 599.5, 303, 369,
24/265 H, 582.1, 582.11, 588.1, 132 AA,
24/132 R, 327, 343, 359, 360, 363, 581.12,
24/588.11, 592.1, 598.1, 598.4, 600.1; 294/82.2,
294/82.33, 192
See application file for complete search history.

(56) References Cited

U.S. PATENT DOCUMENTS

| | | | | |
|---|---|---|---|---|
| 1,545,377 A * | 7/1925 | Westmoreland | ............. | 294/82.2 |
| 3,097,406 A | 7/1963 | Yarborough | | |
| 3,577,583 A * | 5/1971 | Amann | ........................ | 16/87.2 |
| 3,629,905 A | 12/1971 | Cote | | |
| 3,861,007 A * | 1/1975 | Silverman | .................... | 24/600.6 |
| 4,152,814 A * | 5/1979 | Ito | ............................. | 294/82.21 |
| 4,401,333 A * | 8/1983 | Merry | ....................... | 294/82.34 |
| 4,922,645 A | 5/1990 | Hannon et al. | | |
| 5,438,736 A * | 8/1995 | Terada et al. | ................ | 24/599.8 |
| 6,360,408 B1 * | 3/2002 | Dykstra et al. | ............... | 24/598.7 |
| 7,059,023 B1 * | 6/2006 | Wu | .................................. | 24/376 |
| 7,131,616 B2 * | 11/2006 | Livingstone | .................. | 248/304 |
| 7,441,424 B2 | 10/2008 | Saitoh et al. | | |
| 7,636,990 B1 * | 12/2009 | Choate | ......................... | 24/600.1 |
| 7,757,360 B1 * | 7/2010 | Hong | ........................... | 24/600.1 |
| 7,926,152 B2 * | 4/2011 | Emenheiser | .................... | 24/303 |
| 8,001,663 B2 * | 8/2011 | Belcourt et al. | ............. | 24/599.5 |
| 2005/0283953 A1 | 12/2005 | Jeffrey | | |
| 2007/0209168 A1 | 9/2007 | Dietz | | |
| 2007/0214616 A1 * | 9/2007 | Peterson | ...................... | 24/599.1 |
| 2008/0222859 A1 | 9/2008 | Chepurny et al. | | |
| 2008/0250615 A1 | 10/2008 | Emenheiser | | |
| 2009/0193631 A1 * | 8/2009 | Liu | ................................ | 24/458 |
| 2011/0138587 A1 * | 6/2011 | Walker et al. | ................ | 24/599.5 |

FOREIGN PATENT DOCUMENTS

| JP | 05286296 | 11/1993 |
|---|---|---|
| JP | 09184509 | 7/1997 |

* cited by examiner

*Primary Examiner* — Robert J Sandy
(74) *Attorney, Agent, or Firm* — Simpson & Simpson, PLLC

(57) ABSTRACT

A hook is presented that includes a hook formed into a body formed into a hook shape and having a neck and fabricated from nonferromagnetic material with the body having a first end and a second end. The neck is proximate to the first end. The hook also includes a closure that is fabricated from ferromagnetic material and has a first closure end and a second closure end, the closure being pivotally attached to the body and positioned to span a gap between the second end of the hook and the body. There is at least one magnet fixedly attached to the neck, so the at least one magnet holds the closure in a closed position that spans the gap such that the hook encloses a defined space in the closed position.

8 Claims, 5 Drawing Sheets

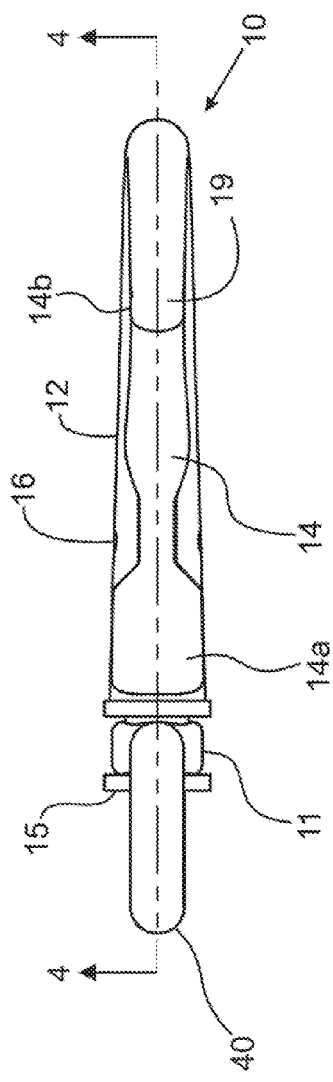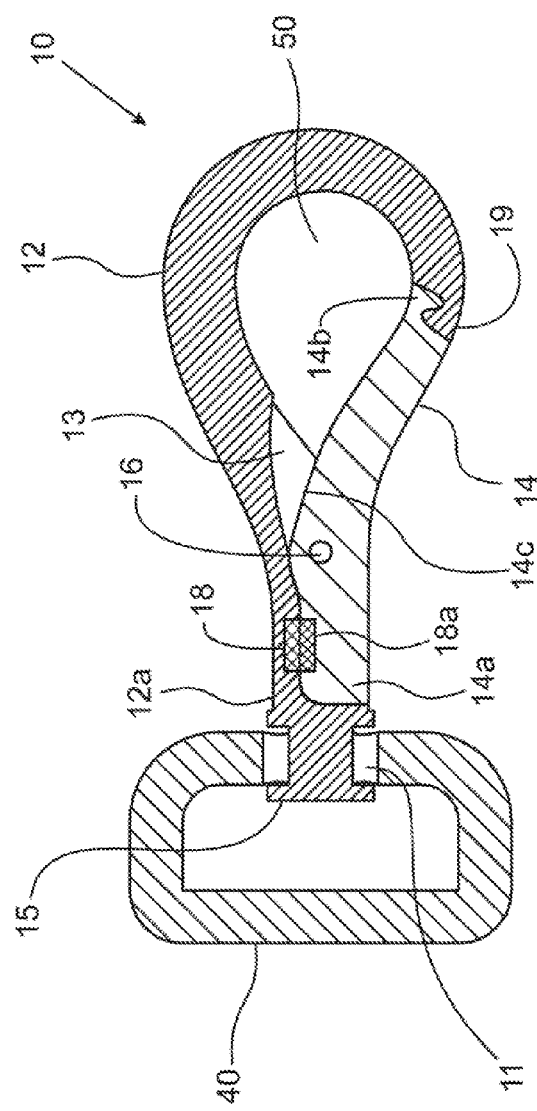
Fig. 3
Fig. 4

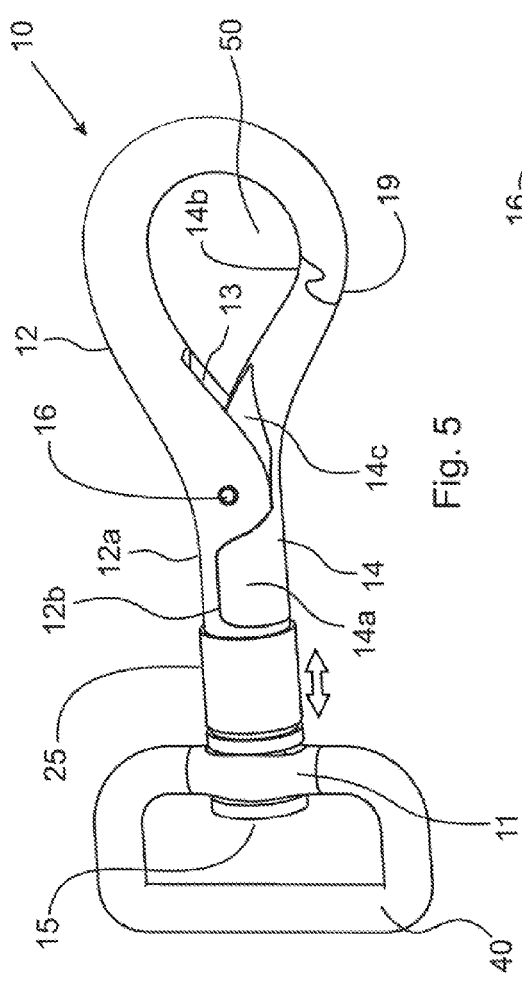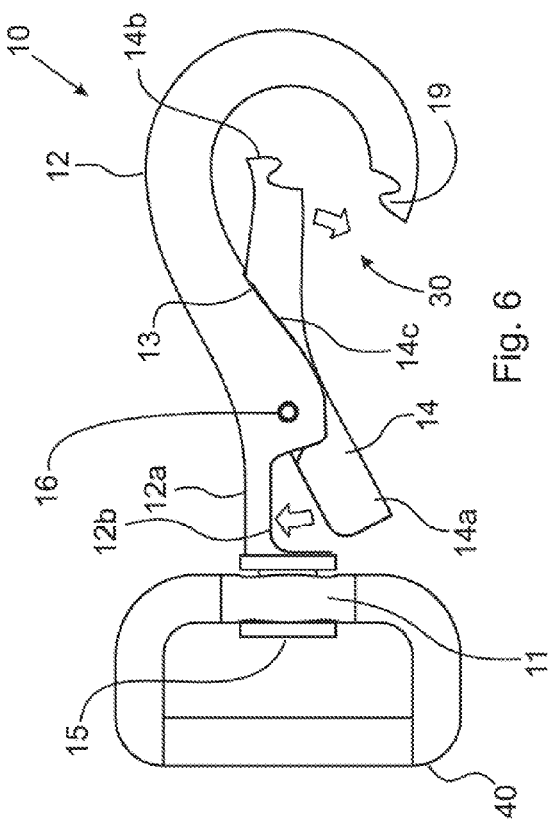

HOOK WITH MAGNETIC CLOSURE

FIELD OF THE INVENTION

The present invention relates generally to the field of hooks, specifically to hooks with a closing mechanism, and more specifically to closures that are manually operated.

BACKGROUND OF THE INVENTION

Manually operated hooks or clasps found in the prior art operate using a spring that holds the hook closure closed when the spring is extended. When springs are extended they exert little or no force, meaning that the hook closure is held closed with little or no force. This makes it relatively easy to slightly open the closure to enable the hooked item to slip off the hook. When the closure is opened, the spring exerts progressively more force making the closure harder to open as spring is compressed. Thus, in prior art hooks of this type, it is harder to purposely open the hook to attach or secure something than it is to accidentally lose something off the hook.

The prior art design tends to cause injuries in that the opened spring can snap forward unexpectedly injuring the user. In addition, the protruding knob used to pull and hold open the spring is often uncomfortable or even painful to operate.

U.S. Pat. No. 7,441,424 to Saitoh, et al. discloses a clamp that opens similar to a scissors with two arms connected by an off-center pivot pin. The two opposing long arms include a pin to hold a security tag or materials while each of the two short arms includes a magnet of opposing polarity which together hold the clamp in the closed position. The clamp has the disadvantage of not securing an item on the arm and not enabling secure movement of the secured item when the disclosed clamp is closed.

U.S. Patent Application Publication No. 2007/0209168 to Dietz teaches a magnetic spring clip that is attached to an instrument such as a pen or penlight. However, the clip requires that a magnet be in the instrument that is held by the clip thereby introducing a limitation to its usefulness in that nonmagnetic devices cannot be securely held by the clip.

U.S. Patent Application Publication No. 2008/0250615 to Emenheiser teaches a retainer apparatus in the form of a modified hook having a closure that is held in the open position by a magnet. The retainer includes a biasing device to move the closure into the closed position. The Emenheiser retainer requires a trigger to activate the biasing which, similar to other prior art discussed above, has reduced force to keep the retainer in the closed position. In addition, the use of a trigger mechanism increases the possibility of injury caused by the inadvertent activation of the biasing trigger.

Thus, it can be seen there is a need in the field for a hook closure that is easily opened and utilizes a positive force to hold a clasp or hook in the closed position around a hook type of device.

SUMMARY OF THE INVENTION

The present invention broadly comprises a hook comprising: a body having a neck and formed into a hook shape and fabricated from nonferromagnetic material with the body having a first end and a second end. The neck is proximate the first end. The hook also comprises a closure having a first closure end and a second closure end that is fabricated from ferromagnetic material, the closure being pivotally attached to the body and positioned to span a gap between the second end of the hook and the body. There is at least one magnet fixedly attached to the neck, wherein the at least one magnet holds the closure in a closed position that spans the gap such that the hook encloses a defined space in the closed position.

One object of the invention is to provide a hook that uses magnetic force to keep the closure in a closed position.

A second object of the invention is to replace a biasing spring to hold a closure in place with a magnetically closed closure.

A third object of the invention is to provide a hook that is safe to use and easy to open.

Another object is to demonstrate a hook that is safer to use than the prior art.

An additional object of the invention is to provide a closure that is easy to open.

A further object is to supply a locking mechanism for the hook.

BRIEF DESCRIPTION OF THE SEVERAL VIEWS OF THE DRAWINGS

The nature and mode of the operation of the present invention will now be more fully described in the following detailed description of the invention taken with the accompanying drawing Figures, in which:

FIG. 3 is a bottom view of the hook showing the closure in the closed position;

FIG. 4 is a cross section of the hook taken along line 4-4 of FIG. 3;

FIG. 5 is a bottom perspective of the present invention depicting the receiving groove 13 formed into the body of the hook;

FIG. 6 is a side view of the hook demonstrating the closure in the open position forming a gap between the second end of the hook and the body of the hook;

DETAILED DESCRIPTION OF EMBODIMENTS OF THE INVENTION

At the outset, it should be appreciated that like drawing numbers on different drawing views identify identical structural elements of the invention. It also should be appreciated that figure proportions and angles are not always to scale in order to clearly portray the attributes of the present invention.

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. Although any methods, devices or materials similar or equivalent to those described herein can be used in the practice or testing of the invention, the preferred methods, devices, and materials are now described. It should be appreciated that the term "proximate" is synonymous with terms such as "nearby", "close", "adjacent", "neighboring", "immediate", "adjoining", etc., and such terms may be used interchangeably as appearing in the specification and claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
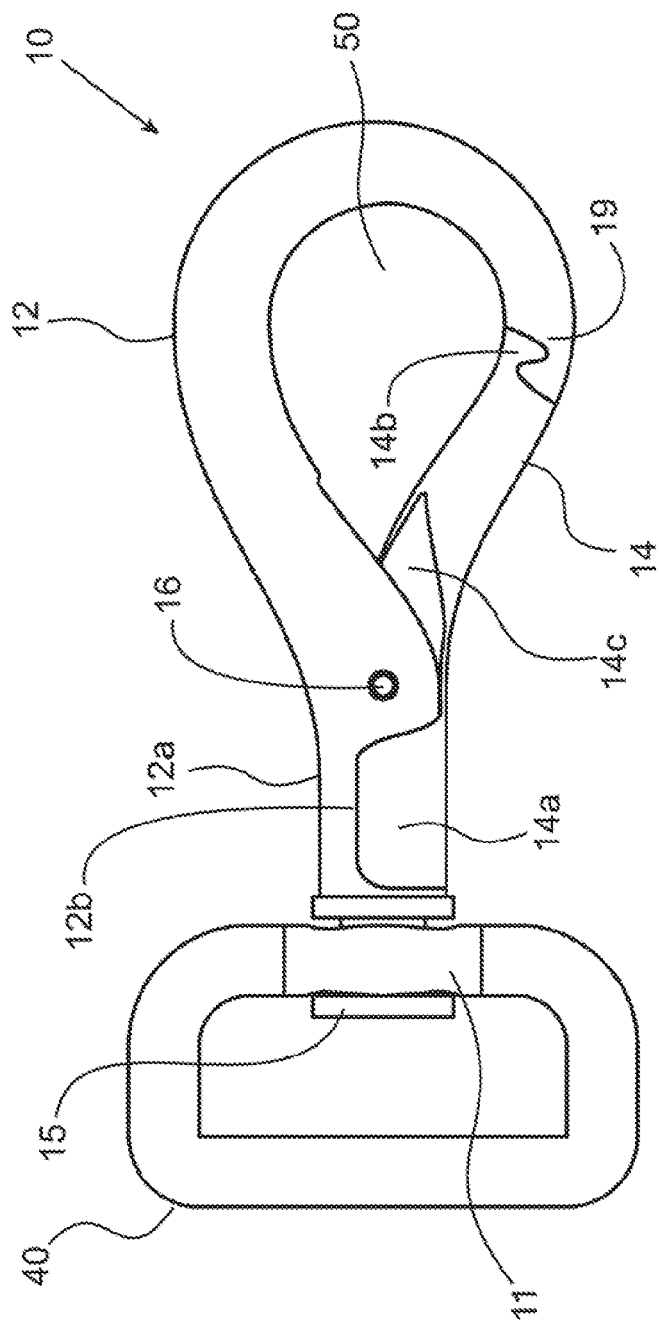
FIG. 1 is a side view of the hook of the present invention.

Adverting to the drawings, FIG. 1 is a side view of hook 10. Hook 10 is attached to ring 40 by attachment 11. Attachment 11 is shown as a swivel attachment that allows hook 10 to move through an arc. Persons of ordinary skill in the art will recognize that other types of attachments 11 are suitable to hold ring 40 to hook 10. Example of such attachments include, but are not limited to, pivot attachments as with ball and socket attachments and solid attachments. Examples of ring 40 include, but area not limited to, o-rings, d-rings, chain attachments, handles, etc.

First end 15 of hook 10 is attached to attachment 11. Neck 12a extends from first end 15 and is preferably integral with body 12. By integral is meant that the component parts are formed together as a single unit. Preferably, hook 12 is fabricated from nonferromagnetic material. By ferromagnetic is meant material that is attracted to magnets. Therefore, the term "nonferromagnetic" describes material that is not attracted to magnets. Body 12 is shaped into a hook having second end 19 at the end of the hook. Body 12 is shown as having a curved shape. It will be recognized that body 12 may have a straight body shape between neck 12a and the curved portion of the hook forming a j-shaped hook.

Closure 14 is pivotally attached to body 12 using pivot 16 and is preferably fabricated from ferromagnetic material. Pivotal attachment 16 enables closure 14 to open and close by rotating on pivot 16. The pivotal attachment is toward the center of closure 14. When closure 14 is in the closed position, it spans the gap between second end 19 and body 12 of hook 10. In a preferred embodiment, second closure end 14b and end b are each configured to form a mating type fit an example of which is seen in FIG. 1.

Figure 2:
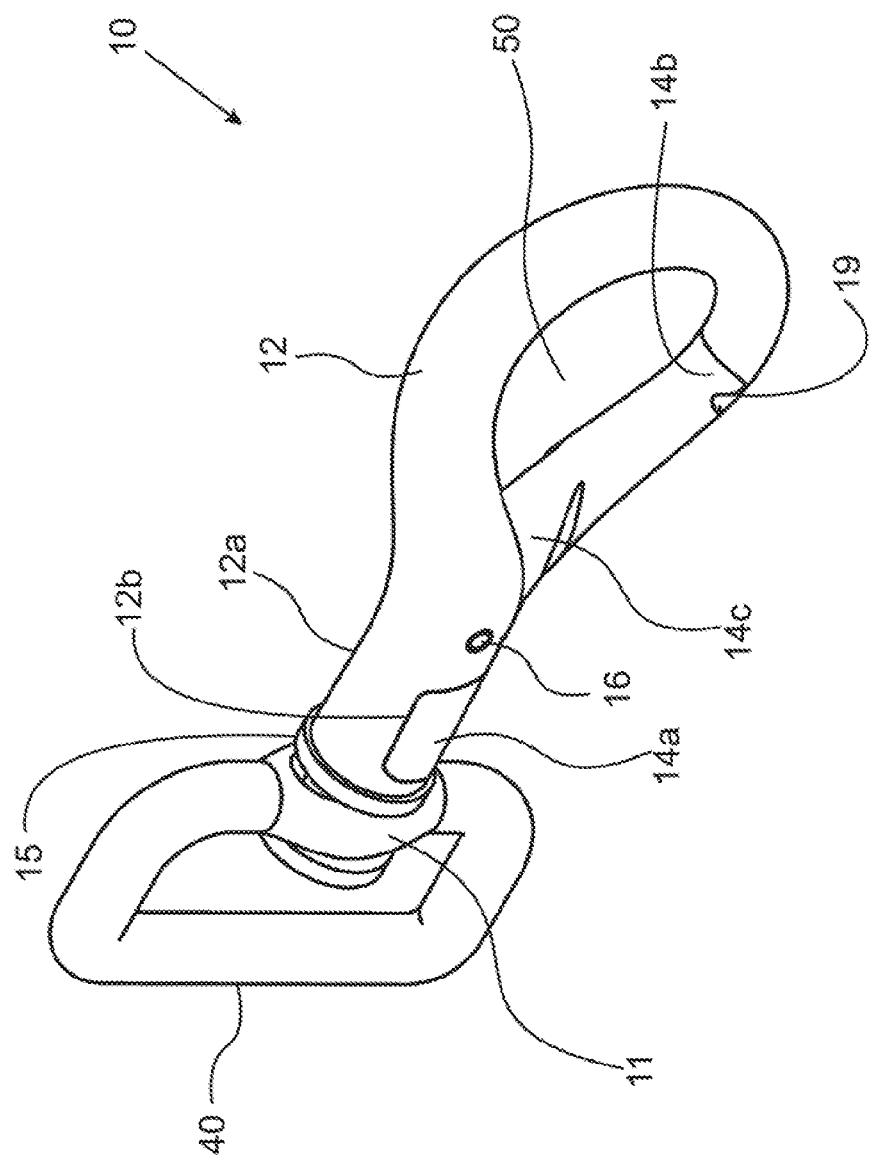
FIG. 2 is a side perspective view the hook of the present invention.

In a preferred embodiment shown in FIG. 1, body 12 and neck 12a are formed to receive closure 14 in both the open and closed positions. Neck 12a is formed to include neck groove 12b which receives first closure end 14a when closure 14 is moved to the closed position extending to second end 19 of hook 10 to decrease the size of neck 12a. In the open position, receiving groove 13 in body 12 (not seen in FIG. 1) receives closure 14 when it is rotated away from second end 19 through space 50 to body 12. Preferably, closure 14 includes region 14c which contacts receiving groove 13 when closure 14 is opened. Preferably, region 14c is formed, for example flattened, to matingly fit into receiving groove 13 to increase the size of space 50 when closure 14 is opened. The size will be increased as a reduced volume of closure 14 will extend into space 50 in the open position. FIG. 2 is a side perspective view of hook 10 showing more clearly region 14c.

FIG. 3 is a bottom view of hook 10 showing closure 14 in the closed position. FIG. 4 is a cross section taken along line 4-4 of FIG. 3. Magnet 18 is seen fixedly attached to neck 12a, preferably so as to have a surface exposed in neck groove 12b. While the manner of fixed attachment shown in FIG. 4 is embedding, it will be recognized that other forms of fixed attachment may be used, such as, but not limited to, adhesives and press fit or friction fit into a recess. FIG. 4 also depicts an alternate embodiment in which magnet 18a is embedded so as to be exposed on the surface of first closure end 14a opposite magnet 18. In this embodiment, magnet 18a will be of the opposite polarity of magnet 18 thereby increasing the magnet force holding closure 14 in the closed position. Preferably, the strength of magnet 18 and/or magnet 18a are such as to enable a user to open closure 14 using one or two fingers. It will be recognized that one or more magnets may be positioned in either neck groove 12b or at first closure end 12a. Also seen is receiving groove 13 in body 12.

FIG. 5 is a bottom perspective view of hook 10 in the closed position showing receiving groove 13 formed into body 12. Also seen is an alternate embodiment in which collar 25 is placed on hook 10 so as to enable it to slide over neck 12a and first closure end 14a. By sliding over and enclosing neck 12a and first closure end 14a, closure 14 is locked by preventing it for rotating around pivot 16 to the open position. The double arrow shows the axial sliding direction of collar 25 on neck 12a. In one embodiment, collar 25 is fabricated from ferromagnetic material which allows it to be held in the locking position by one or both of magnets 18 and 18a.

Figure 7A:
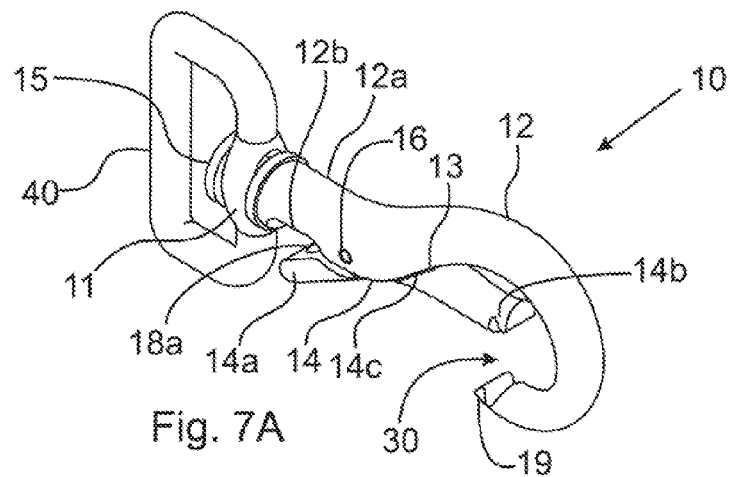
FIG. 7A is a top perspective view of hook 10 in the open position.
Figure 7B:
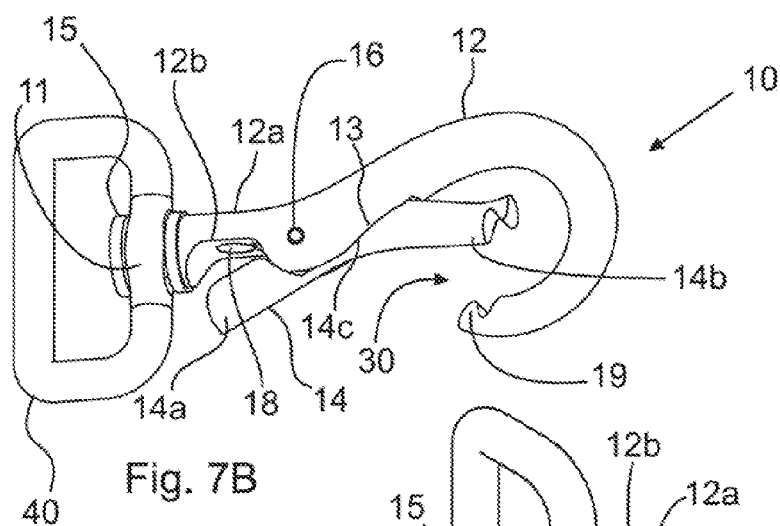
FIG. 7B is a side perspective view of the hook in the open position.

FIG. 6 is a side view of hook 10 demonstrating closure 14 in the open position. In the open position, closure 14 is rotated away from second end 19 to form gap 30 between second end 19 and body 12. In the embodiment shown, region 14c is seen fitting into receiving groove 13. The arrows show the movement of each end of closure 14 from the open to the closed position. FIGS. 7A and 7B are top perspective and side perspective views, respectively, of hook 10 in the open position. FIG. 7A depicts the embodiment that includes magnet 18a fixedly attached to first closure end 14a. FIG. 7B shows magnet 18 in neck 12a with its surface exposed at neck groove 12b.

Figure 8:
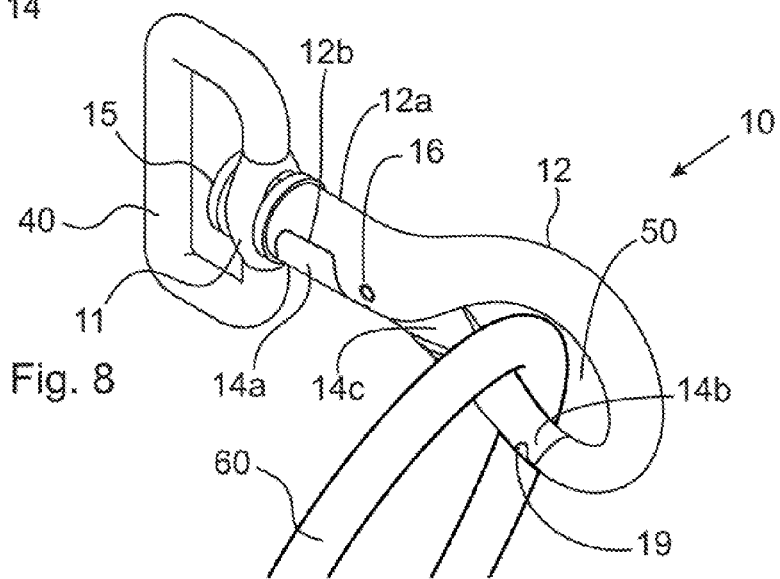
FIG. 8 is a top perspective view of the hook of the present invention securing a loop with the closure in the closed position.

FIG. 8 is a top perspective view of hook 10 demonstrating the advantage of the magnetic closure 14. Loop 60 is enclosed by closed hook 10 within space 50. Although not seen in FIG. 8, persons of skill in the art will recognize that loop 60 is tied off to form a closed loop that prevents it from sliding out of space 50. It can be seen that any force pulling loop 60 against closure 14 will actually apply additional rotational closing force against ferromagnetic closure 14 driving it toward neck groove 12b and magnet 18. It can be seen that the arrangement of using force to hold closure 14 in the closed position provides an advantage over the prior art as it helps to prevent an item held by hook 10 ("hooked item") from slipping out of space 50 as opposed to a closure held in place by an axial spring as in the prior art is easily opened.

Hook 10 is opened to receive a loop or other item by pushing closure 14 so as to rotate second closure end 14b into enclosed space 50. Magnet 18 can be sized to allow first closure end 14a to be released easily by pushing with a finger. In contrast to spring-biased hook closures, the more closure 14 is pushed into space 50, the easier it is to continue pushing because ferromagnetic first closure end 14a is moved further from magnet 18. The same principle applies if magnet 18a, located in first closure end 14*a*, is used with magnet 18 or alone. In addition, there is little snap or sudden closing of closure 14 as found in prior art hooks with biasing springs as the magnetic force only gradually increases as first closure end 14*a* approaches magnet 18. The distance for a sudden closing is limited to 2-3 mm.

Thus it is seen that the objects of the invention are efficiently obtained, although changes and modifications to the invention should be readily apparent to those having ordinary skill in the art, which changes would not depart from the spirit and scope of the invention as claimed.

I claim:

1. A hook comprising:
    a body having a neck and formed into a hook shape and fabricated from nonferromagnetic material, said body having a first end and a second end;
    wherein said neck is proximate to said first end;
    a closure having a first closure end and a second closure end and fabricated from ferromagnetic material, said closure pivotally attached to said body and positioned to span a gap between said second end and said body;
    a single magnet fixedly attached to said neck; and,
    a neck groove proximate said first end to receive said first closure end;
    wherein said neck groove is located entirely within said neck of said body;
    wherein said single magnet holds said first closure end of said closure in a closed position that spans said gap;
    wherein said hook encloses a defined space in said closed position;
    wherein a pivotal attachment is substantially toward a center between said first closure end and said second closure end and said single magnet magnetically holds said first closure end.

2. The hook as recited in claim 1 further comprising a receiving groove formed only on an inner side of said hook shape and facing said defined space wherein said receiving groove receives said second closure end in an open position.

3. The hook as recited in claim 1 wherein said second closure end and said second end of said hook are configured to matingly fit together in said closed position.

4. The hook as recited in claim 1 further comprising a collar, wherein said collar is positioned to slidingly enclose said neck and said closure in said closed position thereby locking said closure in said closed position.

5. The hook as recited in claim 4 wherein said collar is fabricated from ferromagnetic material.

6. The hook as recited in claim 1 further comprising a ring attached to said first end.

7. The hook as recited in claim 1 wherein the first end of said closure and said neck groove are configured to matingly fit together in said closed position.

8. A hook comprising:
    a body having a neck and formed into a hook shape and fabricated from nonferromagnetic material, said body having a first end and a second end;
    wherein said neck is proximate to said first end;
    a closure having a first closure end and a second closure end and fabricated from ferromagnetic material, said closure pivotally attached to said body and positioned to span a gap between said second end and said body;
    a single magnet fixedly attached to said neck;
    a receiving groove formed only on an inner side of said hook shape and facing a defined space wherein said receiving groove receives said second closure end in an open position; and,
    a neck groove proximate said first end to receive said first closure end;
    wherein said neck groove is located entirely within said neck of said body;
    wherein said single magnet holds said first closure end of said closure in a closed position that spans said gap;
    wherein said hook encloses said defined space in said closed position;
    wherein a pivotal attachment is substantially toward a center between said first closure end and said second closure end and said single magnet magnetically holds said first closure end.

* * * * *